(12) United States Patent
Elad et al.

(10) Patent No.: US 12,455,879 B2
(45) Date of Patent: Oct. 28, 2025

(54) DATA MANAGEMENT USING EXTENDED STRUCTURED QUERY LANGUAGE

(71) Applicant: Verix Ltd., Herzliya (IL)

(72) Inventors: Tal Elad, Herzliya (IL); Ami Brucker, Rosh Haayin (IL); Liron Greenwald, Netanya (IL)

(73) Assignee: VERIX LTD., Herzliya (IL)

( * ) Notice: Subject to any disclaimer, the term of this patent is extended or adjusted under 35 U.S.C. 154(b) by 158 days.

(21) Appl. No.: 18/129,493

(22) Filed: Mar. 31, 2023

(65) Prior Publication Data

US 2023/0350889 A1 Nov. 2, 2023

Related U.S. Application Data

(60) Provisional application No. 63/363,753, filed on Apr. 28, 2022.

(51) Int. Cl.
*G06F 16/2452* (2019.01)
*G06F 16/242* (2019.01)
*G06F 16/2455* (2019.01)

(52) U.S. Cl.
CPC .... *G06F 16/24528* (2019.01); *G06F 16/2448* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 2013/0290296 A1* | 10/2013 | Simitsis | ............ | G06F 16/24561 707/774 |
| 2014/0156586 A1* | 6/2014 | Black | ............ | G06F 16/2219 707/600 |
| 2014/0258321 A1* | 9/2014 | Liu | ............ | G06F 16/2438 707/763 |
| 2018/0024731 A1* | 1/2018 | Sanches | ............ | G06F 3/04817 715/763 |

* cited by examiner

*Primary Examiner* — Neveen Abel Jalil
*Assistant Examiner* — John J Morris
(74) *Attorney, Agent, or Firm* — Whitestone Law, PLLC

(57) ABSTRACT

There is provided a computerized method and system of data management using extended Structured Query Language (SQL). The method includes executing an extended SQL script created in response to a data query request and comprising at least one operator of: a first operator embedding a SQL statement, or a second operator embedding a named entity. The executing comprises identifying the at least one operator in the extended SQL script; for each of the at least one operator, evaluating the embedded content thereof in runtime to dynamically generate SQL code based on a runtime input; replacing each of the at least one operator and the embedded content thereof in the extended SQL script with the generated SQL code thereof, giving rise to a standard SQL script; and running the standard SQL script to obtain a processing result of the data query request.

14 Claims, 4 Drawing Sheets

```
select store_name,
{{ SQL statement 1 }}
{{ SQL statement 2 }}
{{ SQL statement 3 }}
from TBL1
group by store_name;
```
302

```
select store_name,
{{ SQL statement 1
    {{ SQL statement 2 }}
}}
from TBL1
group by store_name;
```
304

```
select { named entity 1 },
from {{ SQL statement 1 }}
group by { named entity 1};
```
306

```
select store_name,
{{ SQL statement 1
    where ... { named entity 1 }
}}
from TBL1
group by store_name;
```
308

FIG. 3

DATA MANAGEMENT USING EXTENDED STRUCTURED QUERY LANGUAGE

This Application claims priority under 35 U.S.C. § 119 to U.S. Provisional Patent Application No. 63/363,753, filed Apr. 28, 2022, the content of which is incorporated herein by reference.

TECHNICAL FIELD

The presently disclosed subject matter relates, in general, to the field of data management, and more specifically, to Structured Query Language (SQL) based data management.

BACKGROUND

With rapid development of industrial processes and computerization, organizations possessing massive data face challenges with respect to data management and analysis. Databases are useful tools for organizations to store, organize, and analyze large volumes of organizational data. Data query languages are used to make queries and managing data in databases. A well known example of a data query language is the Structured Query Language (SQL) which is a declarative language designed for managing data in relational databases. Many database structures rely upon SQL as the standard database language to define, read, and manipulate data within a database. The scope of SQL includes data query, data manipulation (insert, update and delete), data definition (schema creation and modification), and data access control.

SQL has many advantages which makes it reliable and efficient for communicating with the database, such as fast query processing, uniform platform and interface, easy to use without complex statement structure and syntax requirements, etc. However, there are also some disadvantages associated therewith, such as limited expressive powers due to the standard's specification, which may limit its application for certain data management functionalities.

Various measures have been taken for the purpose of extending the functionality of the language. In some cases, certain proprietary programming languages, such as Oracle's PL/SQL, Postgres's PL/pgSQL, SQL Server and Sybase's TSQL, or standard programming languages such as Java, Python, C#, PHP, etc., are used to extend SQL functionalities. This however utilizes specific database dialect and may require learning of new syntax rules, therefore requires significantly greater skillset for software development than SQL coding skills. In addition, it requires additional specific database privileges that are not required for standard SQL querying.

SUMMARY

In accordance with certain aspects of the presently disclosed subject matter, there is provided a computerized method of data management using extended Structured Query Language (SQL), the method performed by a processing and memory circuitry (PMC) and comprising: executing an extended SQL script created in response to a data query request, the extended SQL script comprising at least one operator of: a first operator embedding a SQL statement, or a second operator embedding a named entity, wherein the at least one operator is not a standard SQL operator and is indicative of priority of evaluation of embedded content thereof upon the extended SQL script being executed, the executing comprising: identifying the at least one operator in the extended SQL script; for each of the at least one operator, evaluating the embedded content thereof in runtime to dynamically generate SQL code based on a runtime input; replacing each of the at least one operator and the embedded content thereof in the extended SQL script with the generated SQL code thereof, giving rise to a standard SQL script; and running the standard SQL script to obtain a processing result of the data query request.

In addition to the above features, the method according to this aspect of the presently disclosed subject matter can comprise one or more of features (i) to (vi) listed below, in any desired combination or permutation which is technically possible:

(i). The extended SQL script comprises at least one second operator embedding a named entity. A value of the named entity is adaptively configured in runtime upon evaluation, and the evaluating comprises retrieving the value of the named entity in runtime and replacing the at least one second operator and the named entity thereof with the retrieved value.

(ii). The value of the named entity is configured based on runtime user inputs and/or runtime system environment configurations.

(iii). The extended SQL script comprises at least one first operator embedding a SQL statement, wherein the SQL statement is a standard SQL statement or an extended SQL statement.

(iv). The extended SQL script comprises an outer first operator embedding an extended SQL statement comprising one or more inner layers of one or more first operators and/or one or more second operators nested therein. Upon execution of the extended SQL script, the respective embedded contents of the outer first operator and the one or more inner layers of operators are recursively evaluated from an innermost layer to the outer first operator.

(v). The at least one operator is specifically defined with a unique syntax.

(vi). The first operator is represented by double curly braces, and the second operator is represented by single curly braces.

In accordance with other aspects of the presently disclosed subject matter, there is provided a computerized system of data management using extended Structured Query Language (SQL), the system comprising a processor and memory circuitry (PMC) configured to: execute an extended SQL script created in response to a data query request, the extended SQL script comprising at least one operator of: a first operator embedding a SQL statement, or a second operator embedding a named entity, wherein the at least one operator is not a standard SQL operator and is indicative of priority of evaluation of embedded content thereof upon the extended SQL script being executed, the executing comprising: identifying the at least one operator in the extended SQL script; for each of the at least one operator, evaluating the embedded content thereof in runtime to dynamically generate SQL code based on a runtime input; replacing each of the at least one operator and the embedded content thereof in the extended SQL script with the generated SQL code thereof, giving rise to a standard SQL script; and running the standard SQL script to obtain a processing result of the data query request.

This aspect of the disclosed subject matter can comprise one or more of features (i) to (vi) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of data management using extended Structured Query Language (SQL), the method comprising: executing an extended SQL script created in response to a data query request, the extended SQL script comprising at least one operator of: a first operator embedding a SQL statement, or a second operator embedding a named entity, wherein the at least one operator is not a standard SQL operator and is indicative of priority of evaluation of embedded content thereof upon the extended SQL script being executed, the executing comprising: identifying the at least one operator in the extended SQL script; for each of the at least one operator, evaluating the embedded content thereof in runtime to dynamically generate SQL code based on a runtime input; replacing each of the at least one operator and the embedded content thereof in the extended SQL script with the generated SQL code thereof, giving rise to a standard SQL script; and running the standard SQL script to obtain a processing result of the data query request.

This aspect of the disclosed subject matter can comprise one or more of features (i) to (vi) listed above with respect to the method, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 3 illustrates a few examples of an extended SQL script structure in accordance with certain embodiments of the presently disclosed subject matter.

DETAILED DESCRIPTION OF EMBODIMENTS

Figure 1:
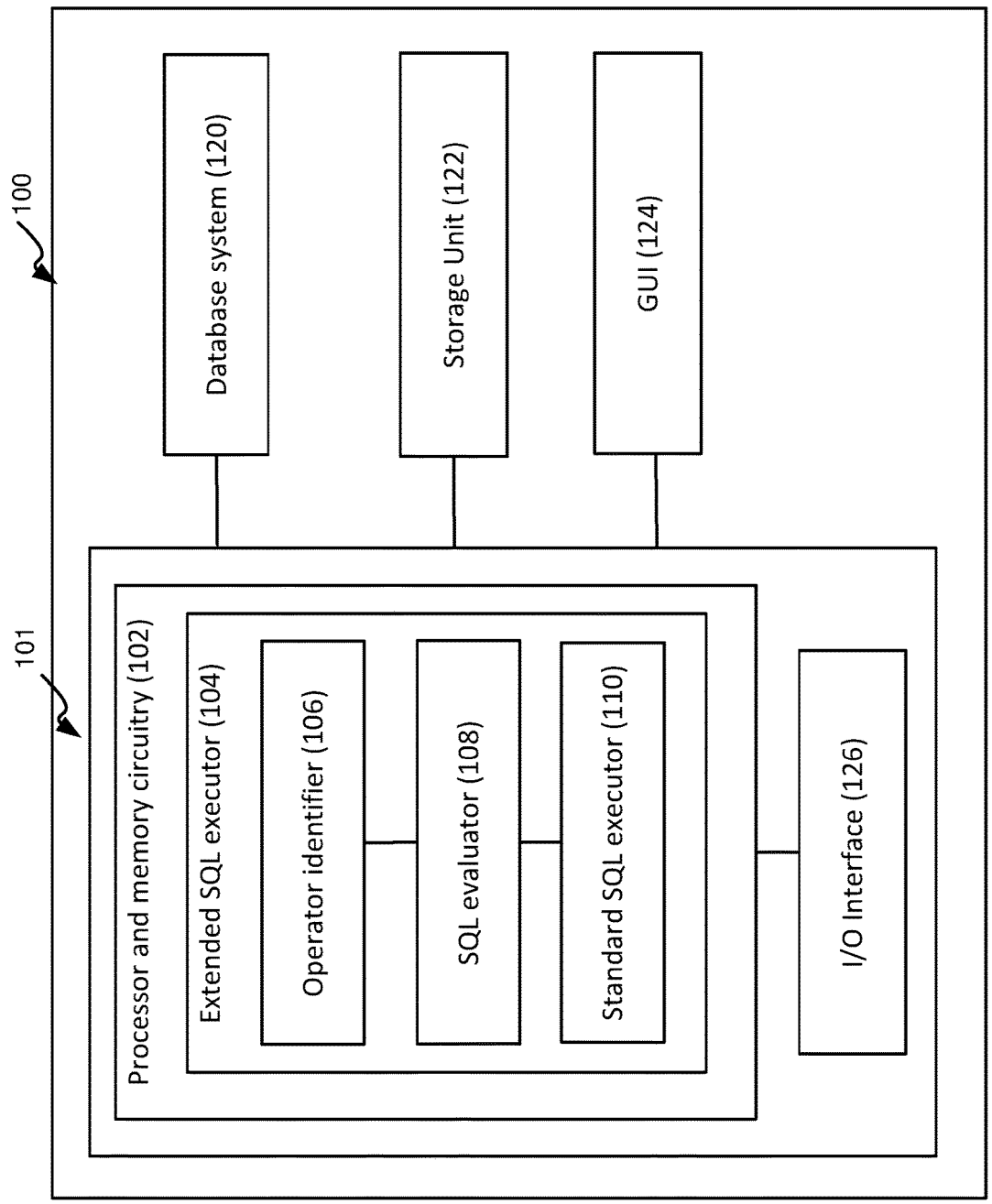
FIG. 1 illustrates a functional block diagram of a data management system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "executing", "identifying", "evaluating", "replacing", "running", "embedding", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the extended SQL execution system and respective parts thereof disclosed in the present application.

The terms "non-transitory computer-readable memory" and "non-transitory computer-readable storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure, or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, one or more stages illustrated in the figures may be executed in a different order and/or one or more groups of stages may be executed simultaneously, and vice versa.

Bearing this in mind, attention is drawn to FIG. 1 illustrating a functional block diagram of a data management system in accordance with certain embodiments of the presently disclosed subject matter.

The system 100 illustrated in FIG. 1 is a computer-based data management system. According to certain embodiments of the presently disclosed subject matter, the system 100 can be configured to manage data using extended Structured Query Language (SQL).

The term standard SQL used herein refers to the commonly used standard SQL language designed for managing data in relational databases. The scope of SQL includes data query, data manipulation (e.g., insert, update, and delete), data definition (e.g., schema creation and modification), and data access control, etc. As aforementioned, standard SQL in some cases may have limited expression powers due to its specification, which may limit, or in some cases complicate, its application for certain data management functionalities.

As aforementioned, using proprietary programming languages or standard programming languages to extend SQL functionalities, requires utilizing specific database dialects and learning of new syntax rules. In addition, it also demands additional specific database privileges that are not usually required for standard SQL querying. Such approaches usually result in complex coding, which, in some cases, may be less computationally efficient for processing and data management.

According to certain embodiments of the presently disclosed subject matter, the present disclosure proposes to use an extended SQL language which is designed as an improved SQL language with extended expression power and functionalities as compared to the standard SQL. The extended capabilities can be enabled by, e.g., a specifically designed syntax and extended SQL executor, as will be described below in further detail.

The extended SQL does not require special database privileges and is compatible with any database SQL dialect, thus drastically reducing and simplifying coding efforts for data management tasks, which enables an efficient implementation and easier on-going maintenance. It can result in less repetitive and error prone codes, and realize functionalities and applications which cannot be achieved by standard SQL. In particular, the extended SQL enables dynamic and automatic generation of SQL code during runtime execution, based on runtime inputs which can adaptively reflect any on-going changes/updates made to the relevant data objects, without the need to manually revise/update the existing code, thus enabling re-usability and adaptiveness of the same code, and efficient buildup of data-driven applications.

In some embodiments, system 100 can be operatively connected to one or more database systems 120. The term "database systems" referred to herein should be expansively construed to cover any databases, data storage, or data repositories configured to store raw data and/or structured data related to certain entities, and/or various database management systems configured for organizing and managing the stored data in such databases.

Data management system 100 includes a processor and memory circuitry (PMC) 102 operatively connected to a hardware-based I/O interface 126. PMC 102 is configured to provide all processing necessary for operating the system 100, as further detailed with reference to FIG. 2, and comprises a processor (not shown separately in FIG. 1) and a memory (not shown separately in FIG. 1). The processor of PMC 102 can be configured to execute several functional modules in accordance with computer-readable instructions implemented on a non-transitory computer-readable memory or storage medium comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. The processor may also be one or more special-purpose processing devices, such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

In certain embodiments, functional modules comprised in PMC 102 can include an extended SQL executor 104 configured to execute an extended SQL script created in response to a data query request. The extended SQL script comprises at least one operator of: a first operator embedding a SQL statement, or a second operator embedding a named entity. The at least one operator is not a standard SQL operator and is indicative of priority of evaluation of embedded content thereof upon the extended SQL script being executed.

The extended SQL executor 104 can comprise the following functional modules: an operator identifier 106, a SQL evaluator 108, and a standard SQL executor 110. Upon execution of the extended SQL script, the operator identifier 106 can be configured to identify the at least one operator in the extended SQL script. The SQL evaluator 108 can be configured to, for each of the at least one operator, evaluate the embedded content thereof in runtime to dynamically generate SQL code (e.g., either standard/extended SQL code), and replace each of the at least one operator and the embedded content thereof in the extended SQL script with the generated SQL code thereof, giving rise to a standard SQL script. The standard SQL executor 110 can be configured to run the standard SQL script to obtain a processing result of the data query request.

Operation of system 100, PMC 102, and the functional modules therein, will be further detailed with reference to FIG. 2.

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store the data query request, the extended SQL script, the standard SQL script, and the processing result, etc. Accordingly, necessary data can be retrieved from the storage unit 122 and provided to the PMC 102 for further processing.

In some embodiments, system 100 can optionally comprise a computer-based graphical user interface (GUI) 124 which is configured to enable user-specified inputs related to system 100. The user may be provided, through the GUI, with options of defining certain operation parameters. The user can be anyone using SQL to query data (e.g., business intelligence (BI) developer, data engineer, database administrator (DBA), data analyst, etc.), who, upon receiving a data query request, provides an extended SQL script to system 100 for execution. The user may also view the processing result through the GUI, such as, e.g., the retrieved data in response to execution of the extended SQL script. In some cases, the user can provide runtime inputs for certain operation parameters through the GUI. Optionally, the processing result can be sent, through the I/O interface 126, to a different system (e.g., a database management system) or data repository that are operatively connected to the system 100, for further rendering.

Those versed in the art will readily appreciate that the teachings of the presently disclosed subject matter are not bound by the system illustrated in FIG. 1. Equivalent and/or modified functionality can be consolidated or divided in another manner and can be implemented in any appropriate combination of software with firmware and/or hardware.

It is noted that the system 100 illustrated in FIG. 1 can be implemented in a distributed computing environment, in which the aforementioned functional modules shown in FIG. 1 can be distributed over several local and/or remote devices, and can be linked through a communication network. It is further noted that, in some cases, at least part of the database system 120, storage unit 122, and/or GUI 124, can be external to system 100 and operate in data communication with system 100 via I/O interface 126. Alternatively, the respective functions of these components can be at least partly integrated with system 100, thereby facilitating and enhancing the functionalities of the system. By way of another example, the database system 120 or the storage unit 122 therein can be shared with other systems or be provided by other systems, including third party equipment.

It is noted that the presently disclosed system 100 can be implemented in a computer or a computerized machine, within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is described, the term "machine" shall also be taken to include any collection of machines that individually or jointly execute a set (or multiple sets) of instructions to perform any one or more of the methodologies discussed herein.

Figure 2:
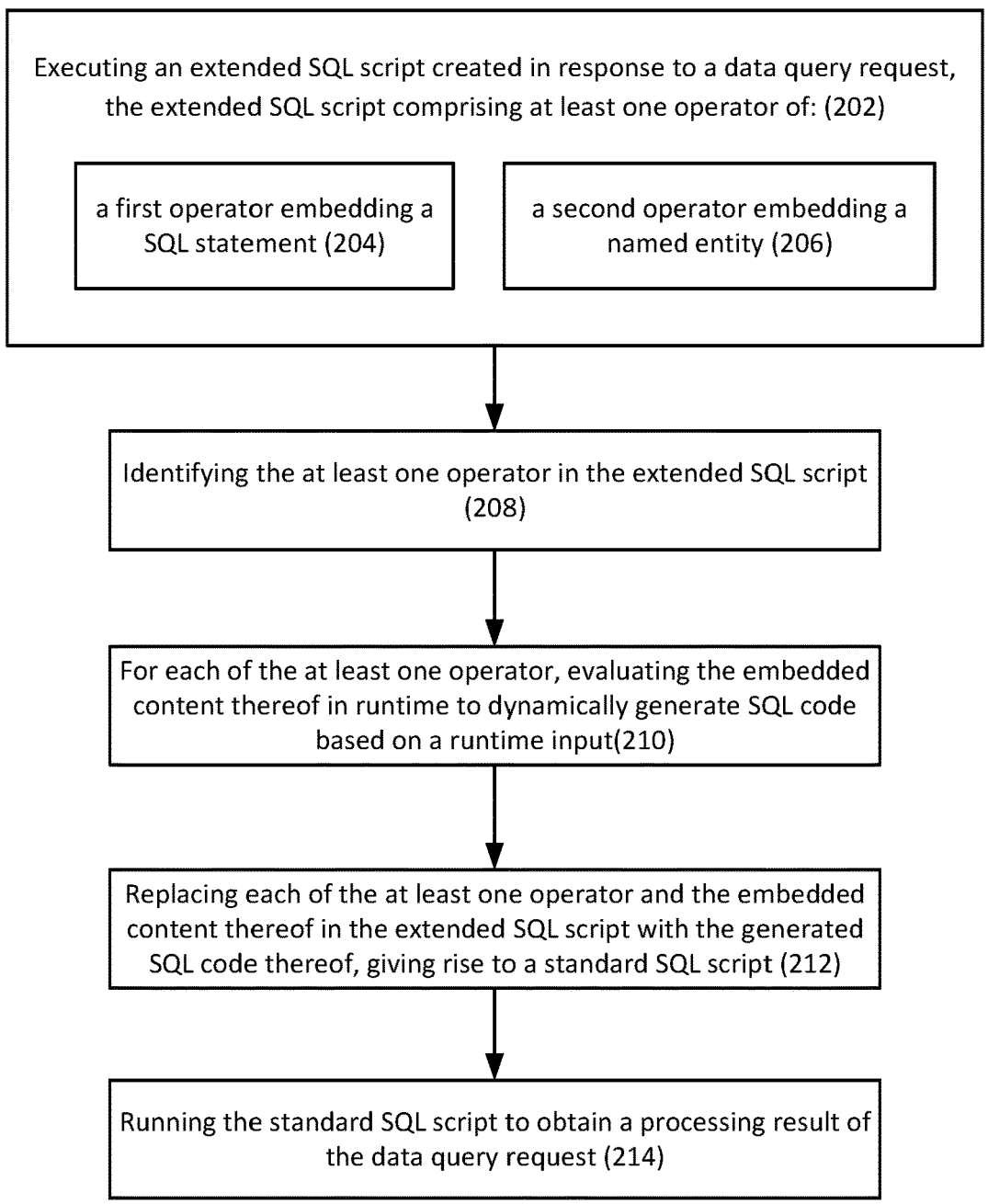
FIG. 2 illustrates a generalized flowchart of data management using extended SQL in accordance with certain embodiments of the presently disclosed subject matter.

While not necessarily so, the process of operation of system 100 can correspond to some or all of the stages of the method described with respect to FIG. 2. Likewise, the method described with respect to FIG. 2 and its possible implementations can be implemented by system 100. It is therefore noted that embodiments discussed in relation to the method described with respect to FIG. 2 can also be implemented, mutatis mutandis, as various embodiments of the system 100, and vice versa.

Referring to FIG. 2, there is illustrated a generalized flowchart of data management using extended SQL in accordance with certain embodiments of the presently disclosed subject matter.

In response to a data query request, an extended SQL script can be created by a user, which can be anyone using SQL to query data (e.g. BI developer, data engineer, DBA, data analyst, etc.), for querying a database and retrieving/managing data as requested. Although termed as a data query request, the term should be broadly construed to cover any data management related requests from a user of the database, including data query, data manipulation, data definition, and data access control etc.

The extended SQL script is written with the extended SQL language as described above. Specifically, the extended SQL script comprises at least one special operator. A special operator is not a standard/legitimate operator as commonly used in standard SQL, and is defined with a unique syntax. The special operator can be indicative of priority of evaluation/execution of embedded content thereof upon the extended SQL script being executed. In other words, when the extended SQL script is executed, the embedded content in the special operator will be evaluated/executed first, prior to execution of the remaining part of the script.

In some embodiments, the extended SQL script can comprise at least one special operator of: a first operator embedding a SQL statement, or a second operator embedding an environmental parameter. By way of example, the first operator can be represented by double curly braces (e.g., {{ ... }}), and the second operator can be represented by single curly braces (e.g., { ... }), or vice versa. It is noted that this is for illustrative and exemplary purposes only, and any other operators which are not legitimate operators in standard SQL can be used in lieu of the above as the first and/or second operator.

The first operator can embed/delimit a SQL statement. SQL statements are used to perform actions/operations on a database. By way of example, the following SQL statement "SELECT*FROM Customers;" is used to select all the records in a "Customers" table. The SQL statement embedded in the first operator can either be a standard SQL statement or an extended SQL statement. For instance, in some cases, the SQL statement embedded in the first operator can further embed additional special operators (either the first and/or the second operators), thus serves as an extended SQL statement.

The second operator can embed/delimit a named entity. A named entity generally refers to a real-world object (either abstract or physical), such as a person, location, organization, product, etc., denoted with a proper name In other words, named entities can be regarded as specific entity instances. In the context of the present disclosure, a named entity can refer to a piece of texual content denoted by a name A named entity can be any text parameter, such as, e.g., the "SP_AGG_LEVEL", or "SP_TABLE_OR_VIEW" as exemplified in the examples detailed below. In some embodiments, the value of the named entity embedded in the second operator can be provided based on runtime user inputs and/or runtime system environment configuration/settings.

The extended SQL script as described above, which is created in response to the data query request, can be executed (202) (e.g., by the extended SQL executor 104 in PMC 102) for retrieving the processing result for the request. The extended SQL script comprises at least one operator of: a first operator 204 embedding a SQL statement, or a second operator 206 embedding a named entity.

Specifically, upon execution, the at least one operator comprised in the extended SQL script can be identified (208) (e.g., by the operator identifier 106) in the extended SQL script. As the at least one operator is a special operator selected to differentiate from common/standard SQL operators, the operator identifier 106 can be configured to search and identify the special operator from the script. By way of example, in some cases, the extended SQL script may include one or more first operators, either listed in parallel, or in a nested manner In some other cases, the extended SQL script may include one or more second operators. In further cases, the extended SQL script may include one or more first operators and one or more second operators.

Referring to FIG. 3, there are illustrated a few examples of an extended SQL script structure in accordance with certain embodiments of the presently disclosed subject matter.

The extended SQL script 302 includes three first operators (represented by double curly braces) listed in parallel, in a sequential manner Each first operator embeds a respective SQL statement. The extended SQL script 304 includes two first operators: an outer first operator embedding a SQL statement 1 (an extended SQL statement) which further embeds an inner first operator with an inner SQL statement 2 embedded therein. Although not illustrated, in some cases, the inner SQL statement 2 can further include one or more additional inner layers of inner first operators (and/or second operators) nested therein. In such cases, the inner SQL statement 2 becomes an extended SQL statement.

The extended SQL script 306 includes both first and second operators listed in parallel: a second operator (represented by single curly braces) in the "select" clause embedding a named entity 1, a first operator in the "from" clause embedding a SQL statement 1, and another second operator embedding the same named entity 1 in the "group by" clause. Optionally, the SQL statement 1 in the first operator can further embed one or more additional inner layers of inner first operators (and/or second operators). The extended SQL script 308 includes a first operator embedding a SQL statement 1 which further embeds a second operator in the "where" clause, thus rendering the SQL statement 1 as an extended SQL statement.

It is to be noted that the examples illustrated in FIG. 3 are for illustrative purposes only. The present disclosure is not limited by the number of first and/or second operators embedded in the extended SQL script, or the specific way of including them in the extended SQL script.

For each of the at least one operator as identified in the extended SQL script, the embedded content thereof (either the SQL statement or the named entity) can be evaluated (210) (e.g., by the SQL evaluator 108) in runtime to dynamically generate SQL code based on one or more runtime inputs. Each of the at least one operator and the embedded content thereof in the extended SQL script can be replaced (212) (e.g., by the SQL evaluator 108) with the generated SQL code thereof, giving rise to a standard SQL script. The standard SQL script can be run/executed (214) (e.g., by the extended SQL executor 110) to obtain a processing result of the data query request. There are now described a few examples of extended SQL scripts for illustrative purposes.

By way of example, in response to a data query request for illustrating weekly sales for different stores, a user needs to create, from a row-based data source table TBL1, where each row represents a sales transaction (sales in a certain store on a certain date/time), a columnar based report, in which each column represents sales in a respective week N for a store. In other words, the user needs to transpose the data in the source table TBL1.

Using standard SQL, the SQL script can be written as follows, for the purpose of aggregating rows in TBL1 into columns:

select store_name,
  sum(case when week=20191031 then sales else null end)
    as week_20191031,
  sum(case when week=20191101 then sales else null end)
    as week_20191101,
  sum(case when week=20191108 then sales else null end)
    as week_20191108,
  sum(case when week=20191115 then sales else null end)
    as week_20191115,
  sum(case when week=20191122 then sales else null end)
    as week_20191122,
  sum(case when week=20191129 then sales else null end)
    as week_20191129,
  sum(case when week=20191130 then sales else null end)
    as week_20191130,
  sum(case when week=20191130 then sales else null end)
    as week_20191130,
  sum(case when week=20191206 then sales else null end)
    as week_20191206,
  sum(case when week=20191213 then sales else null end)
    as week_20191213,
  sum(case when week=20191220 then sales else null end)
    as week_20191220,
. . .
from TBL1
group by store_name As illustrated, a separate SQL code has to be written for each specific week of the year, which is time-consuming and repetitive for the user to implement. This is because for a query related to a data object (e.g., week) which has dynamically updated values, standard SQL can only use repetitive codes to address each of the object values. In case of a new value being added, new code has to be inserted.

Therefore, the resulting code is lengthy, cumbersome, and error prone. In addition, the code needs to be maintained and updated on an on-going basis in response to new queries from a user, when the user will need to add additional lines to the code for the new weeks where the sales data becomes available. Such shortcomings render the above approach difficult to implement, and are less reliable.

Alternatively, the user may realize the transposition from rows to columns using a PIVOT command. However, this command is not available for all database engines. In addition, the specific weeks are still required to be explicitly listed in the code even when using the PIVOT command, thus still suffering from the above issues.

Using the currently proposed extended SQL language, an extended SQL script can be created in response to the above data query request. An exemplary extended SQL script is illustrated as follows:

```
select store_name,
  {{ select 'sum(case when fk_date_split_week=' || week_num || ' then trx else
null end) as week_'|| week_num || ',' from WEEKS_TBL }}
  from TBL1
  group by store_name;
```

As shown, the extended SQL script includes a special operator (e.g., the first operator {{ . . . }} of the extended SQL language) which is used to embed a SQL statement of "select . . . from . . . ". The SQL statement recites a generic SQL code for aggregation of weekly sales for respective weeks from a week table (i.e., weeks_tbl). Specifically, the week numbers (week_num) are taken as values of a field from the week table (weeks_tbl) where the field values are automatically updated whenever new week data is added.

When the extended SQL script is executed, the first operator is firstly identified, and the embedded content of the first operator (i.e., the SQL statement of "select . . . from . . . ") is evaluated. Evaluation of the embedded SQL statement refers to executing the embedded SQL statement. By way of example, upon evaluation of the above SQL statement (i.e., the clause of "select 'sum(case when fk_date_split_week='||week_num||' then trx else null end) as week_'|| week_num|| ',' from WEEKS_TBL"), the below SQL code is generated in runtime based on the runtime input of the updated week numbers retrieved from the week table in runtime:

sum(case when week=20191031 then sales else null end) as week_20191031,
sum(case when week=20191101 then sales else null end) as week_20191101,
sum(case when week=20191108 then sales else null end) as week_20191108,
sum(case when week=20191115 then sales else null end) as week_20191115,
sum(case when week=20191122 then sales else null end) as week_20191122,
sum(case when week=20191129 then sales else null end) as week_20191129,
sum(case when week=20191130 then sales else null end) as week_20191130,
sum(case when week=20191130 then sales else null end) as week_20191130,
sum(case when week=20191206 then sales else null end) as week_20191206,
sum(case when week=20191213 then sales else null end) as week_20191213,
sum(case when week=20191220 then sales else null end) as week_20191220, The above generated SQL code is then placed in the extended SQL script to replace the first operator and the embedded content thereof, thereby generating a standard SQL script. The standard SQL script generated in this case would be similar to the SQL code originally written with standard SQL, as exemplified above, but with an updated scope of week numbers at the time of the query request. The standard SQL script is then executed to obtain the processing result of the data query request, i.e., the columnar report where each column represents sales in a respective week.

It can be seen that the above extended SQL script created using the extended SQL syntax is much shorter and more concise, as compared to the original standard SQL script. Every time, upon the extended SQL script being executed, the generic SQL statement is first evaluated to generate standard SQL code in runtime based on the input of currently updated scope of interest (e.g., the week numbers as retrieved from the week table which is dynamically updated), thus adaptively reflecting any on-going changes/updates made to the sales data per week, without the need to manually update the SQL code every time there is a query request. This not only avoids repetitive coding, but also enables the extended script to be adaptive to any data objects with changing values.

Another similar use case example is illustrated below. A user is requested to create a list that specifies certain tables' counts to be used for a planned task of database cleaning. Using standard SQL, the user needs to create a manual insert query per table in the database, as follows:

Insert into tables_list(table_name,row_count) select 'tbl1',count(*) from tbl1;
Insert into tables_list(table_name,row_count) select 'tbl2', count(*) from tbl2;
Insert into tables_list(table_name,row_count) select 'tbl3', count(*) from tbl3;
Insert into tables_list(table_name,row_count) select 'tbl4', count(*) from tbl4;
. . .

Similarly, in standard SQL, a separate SQL code has to be written for each specific table in the database that is relevant for database cleaning, which is time-consuming and repetitive for the user to implement, and results in cumbersome and error prone code, as illustrated above. In addition, the code needs to be maintained and updated on an on-going basis in response to new queries from the user, when the user will need to add additional lines to the code for new tables added to the database. Although a stored procedure can be created to loop over a cursor and get the row counts, this needs to be implemented using additional tools such as the pl/sql program, which requires higher development skills and still results in a lot of complex coding.

Using the extended SQL language, an extended SQL script can be created in response to the above data query request, as follows:

{{ Select
'insert into tables_list (table_name,row_count) select '''|| table_name ||'''
,count(*) from '|| table_name||';'
From user_tables }}

The extended SQL script includes the first operator embedding a SQL statement of "select . . . 'insert . . . from . . . ' from . . . ". The SQL statement recites a generic insert SQL code for creating a row count for each table in the database. Specifically, the table names are taken as values of a field from another table (user_tables) where the field values are automatically updated whenever new table data is added.

When the extended SQL script is executed, the first operator is firstly identified, and the embedded content of the first operator (i.e., the SQL statement of "select . . . 'insert . . . from . . . ' from . . . ") is evaluated, thus generating in runtime the below SQL code based on the currently updated scope of interest (e.g., the updated tables retrieved from the user_tables which is dynamically updated) in runtime:

Insert into tables_list(table_name,row_count) select 'tbl1',count(*) from tbl1;
Insert into tables_list(table_name,row_count) select 'tbl2', count(*) from tbl2;
Insert into tables_list(table_name,row_count) select 'tbl3', count(*) from tbl3;
Insert into tables_list(table_name,row_count) select 'tbl4', count(*) from tbl4;
Insert into tables_list(table_name,row_count) select 'tbl5', count(*) from tbl5;
. . .

By evaluating the SQL statement embedded in the first operator, the generated code can adaptively reflect any on-going changes/updates made to the tables listed in the database. For instance, assume tbl5 is a new table that was added to the database after the query was lastly executed. Upon new execution of the extended SQL query, the SQL code, as generated in runtime upon evaluation, will automatically include a new line of code for inserting the row count of tbl 5, as illustrated above, without the need for the user to manually update the code.

The generated SQL code is placed in the extended SQL script to replace the first operator and the embedded content thereof, thereby generating a standard SQL script. The standard SQL script is then executed to obtain the processing result of the data query request, i.e., a list of table counts for different tables in the database.

By way of a further use case example, the user is requested to create a geographical-level sales aggregation, and read sales data from different tables according to a data state parameter or a user driven parameter which may be indicative of the requested aggregation level (represented by, e.g., SP_AGG_LEVEL). Such a request cannot be achieved using standard SQL, because of the need to read data from different tables based on a parameter whose value can only be obtained in runtime, e.g., based on runtime user inputs. Other languages (e.g. PL/SQL, Java, etc.) are needed to implement the requested functionality, thus requiring higher development skills and/or specific database privileges.

In such cases, the extended SQL script can be used to realize the data query request, for instance, as follows:

```
select {SP_AGG_LEVEL}, sum(sales) as total_sales
from {{ select case when     {SP_AGG_LEVEL}='Region' then
'SALES_AGG_STORES' else   'SALES_AGG_CHNNELS'    from
user_agg_level }}
  group by {SP_AGG_LEVEL}
```

The above extended SQL script includes a second operator (e.g., the single curly braces) embedding a named entity, representative of the parameter, indicative of the requested aggregation level (e.g., SP_AGG_LEVEL). The extended SQL script also includes a first operator (e.g., the double curly braces) embedding a generic SQL statement (e.g., select . . . from . . . ) which further embeds the second operator (e.g., SP_AGG_LEVEL) in a conditional clause of "when . . . then . . . else . . . " within the select SQL statement.

In such cases, there are an outer layer of operators, and one or more inner layers of operators nested therein. Upon execution of the extended SQL script, the embedded contents of these operators will be evaluated recursively from an innermost layer (of the one or more inner layers) to the outer layer.

In particular, in the present example, the first operator {{ . . . }} in the from clause is an outer operator having an inner layer of a second operator { . . . } embedded/nested therein. The embedded content of the second operator (i.e., the named entity) in the inner layer will be evaluated first. The value of the named entity (e.g., SP_AGG_LEVEL) embedded in the second operator can be retrieved in runtime, based on runtime user inputs and/or runtime system environment configurations, and the second operator and the embedded named entity in the extended SQL script is replaced with the retrieved value thereof.

Figure 4:
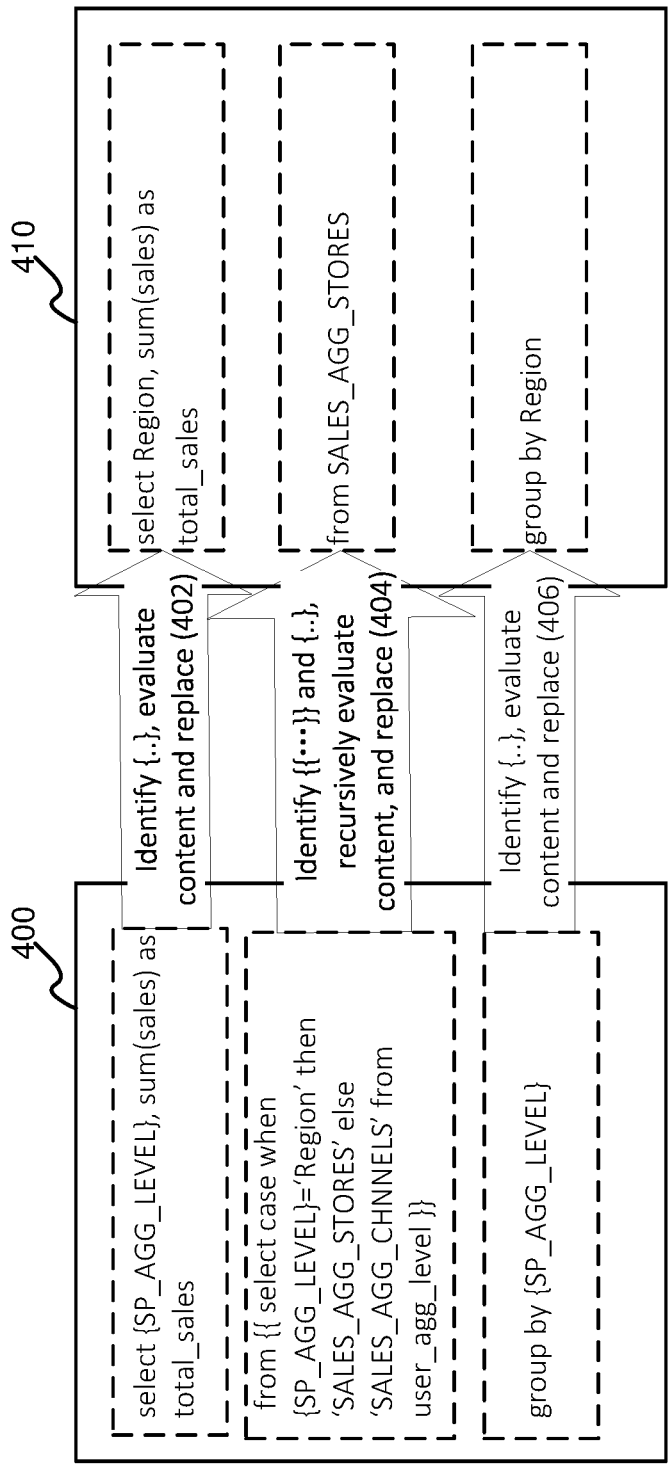
FIG. 4 illustrates a generalized flow of executing the extended SQL script in accordance with certain embodiments of the presently disclosed subject matter.

FIG. 4 illustrates a generalized flow of executing the above extended SQL script in accordance with certain embodiments of the presently disclosed subject matter.

The extended SQL script is illustrated in block 400. As shown in step 402, the second operator { . . . } in the select clause "select {SP_AGG_LEVEL}" is first identified. The embedded content thereof SP_AGG_LEVEL is evaluated. As SP_AGG_LEVEL is an named entity and there is no further inner layer thereof, the value of the named entity is retrieved in runtime and placed in the script to replace the second operator and the content thereof, i.e., the {SP_AGG_LEVEL}. By way of example, assume the value of SP_AGG_LEVEL is provided by the user in runtime as "Region". Upon evaluation, the select clause is parsed and the following SQL code is generated:

select Region, sum(sales) as total_sales.

Next, in step 404, the first operator {{ . . . }} is identified in the from clause. Upon evaluating the embedded content thereof, the inner layer of the second operator nested therein is identified, whose content will be evaluated first. Similarly, as described above, the embedded content thereof SP_AGG_LEVEL is a named entity, and there is no further inner layer. The value of the named entity (e.g., Region) is retrieved in runtime and placed in the script to replace the second operator and the content thereof. Upon evaluation of the inner layer, the from clause is parsed into the following SQL code:

```
from {{ select case when Region ='Region' then 'SALES_AGG_
  STORES'
else 'SALES_AGG_CHNNELS' from user_agg_level }}
```

Next, the embedded content of the outer first operator (the double curly braces) will be evaluated, and the from clause is further parsed to the following SQL code:

from SALES_AGG_STORES

Then in step 406, the second operator in the "group by" clause is identified. Similarly, as described above, the embedded content thereof SP_AGG_LEVEL is a named entity, and there is no further inner layer. The value of the named entity (e.g., Region) is retrieved in runtime and placed in the script to replace the second operator and the content thereof. Upon evaluation, the "group by" clause is parsed into the following SQL code:

group by Region

By this time, the entire script 400 has been traversed and evaluated, thereby obtaining a standard SQL script 410 as follows:

select Region, sum(sales) as total_sales
from SALES_AGG_STORES
group by Region

The standard SQL script 410 as generated above can be executed to obtain a processing result which represents a region-level sales aggregation.

Similarly, in a further use case example, the user is requested to count the number of rows in either tables or views in the database, according to a user driven parameter (represented by, e.g., SP_TABLE_OR_VIEW, where the value of the SP_TABLE_OR_VIEW can be either the string of "table" or the string of "view", which, when concatenated with the "_name" string, represents a column name "table_name" or "view_name"). Such a request cannot be achieved using standard SQL because of the need to generate different "insert" statements based on a parameter (SP_TABLE_OR_VIEW) whose value can only be obtained in runtime, e.g., based on runtime user inputs, and read from different entities in the database based on the result of an extended SQL statement nested therein. Instead, an extended SQL script for such request can be created as follows:

```
{{ Select
  'insert into row_count_list (obj_name,row_count) select '''||
{SP_TABLE_OR_VIEW}_name ||'"' ,count(*) from '||
{SP_TABLE_OR_VIEW}_name||';'
From {{ select case when '{SP_TABLE_OR_VIEW}'='table' then
'USER_TABLES' else 'USER_VIEWS' from dual }}
}}
```

Based on a runtime user input, in cases where the value of the parameter SP_TABLE_OR_VIEW is provided by the user as "table", the above extended SQL script can be evaluated to generate standard SQL code as follows:

Insert into row_count_list(obj_name,row_count) select 'tbl1',count(*) from tbl1;

Insert into row_count_list(obj_name,row_count) select 'tbl2', count(*) from tbl2;

Insert into row_count_list(obj_name,row_count) select 'tbl3', count(*) from tbl3;

In cases where the value of the parameter SP_TABLE_OR_VIEW is provided by the user as "view", the above extended SQL script can be evaluated to generate standard SQL code as follows:

Insert into row_count_list(obj_name,row_count) select 'view1', count(*) from view1;
Insert into row_count_list(obj_name,row_count) select 'view2', count(*) from view2;
Insert into row_count_list(obj_name,row_count) select 'view3', count(*) from view3;

It is to be noted the above-described use case examples are illustrated for illustrative and exemplary purposes only, and should not be deemed as limiting the present disclosure in any way. The extended SQL can be used in various other suitable use cases and applications which may benefit from the extended capabilities of the extended SQL language.

Among advantages of certain embodiments of the extended SQL execution process as described herein is the ability to extend the standard SQL's expressive power, thereby simplifying the development process and resulting in less repetitive and error prone codes. In some cases, the extended SQL can realize functionalities and applications which could not have been achieved by standard SQL, as illustrated by some use cases above.

In addition, upon execution of the extended SQL script, the content embedded in the special operators thereof can be firstly evaluated to dynamically generate SQL code based on runtime inputs. For instance, in cases of a first operator embedding a generic SQL statement, the SQL statement can be evaluated to generate SQL code based on the input of a currently updated scope of interest (such as, e.g., the week numbers as retrieved from the week table, which is dynamically updated, as illustrated in one use case example above). In cases of a second operator embedding a named entity, the named entity can be evaluated based on runtime user input or environment/system configurations (such as, e.g., table or view, as illustrated in one use case example above).

Therefore, the dynamic SQL code, as generated in runtime, can adaptively reflect on-going changes/updates made to the relevant data objects, without the need to manually update the SQL code each time there is a new query request. This not only generates more robust code, but also avoids the need to maintain the code on an on-going basis, and enables the extended script to be automatically adaptive to any entity/objects with changing values.

Such extended SQL execution can result in an improved processing result with higher accuracy and lower error rate (e.g., as compared to using standard SQL) due to the automatic generation of SQL code in runtime which is adapted to on-going changes of data objects.

It is to be noted that, in some cases, the extended SQL executor 104 can be regarded as comprising an extended SQL compiler (not illustrated in FIG. 1) specifically designed to perform a compiling process to convert the source code of the extended SQL to a standard SQL, which can be executed by a standard SQL executor. By way of example, the extended SQL compiler referred to herein can be configured to perform the following functionality of the extended SQL executor 104: identifying the at least one special operator, evaluating the embedded content thereof in runtime to dynamically generate SQL code based on runtime input, and replacing the at least one operator and the content thereof with the generated SQL code to give rise to a standard SQL script.

The extended SQL compiler is thus an added compiler program (on top of the standard SQL compiler) for creating a particular computer for converting the source code of the extended SQL into target standard SQL code. Adding such a special compiler transforms the computer to a different state (a special computer) which will be able to compile the new language of extended SQL. Once the standard SQL script is derived, a standard SQL executor 110 (which comprises a standard SQL compiler) can be used to process the standard SQL and obtain a processing result.

In addition, a compiler changes the memory of a computer when executed. Specifically, for instance, the parser within the compiler generates a parse tree or other data structure for manipulating memory space of the computer. Therefore, the extended SQL compiler also demonstrates physical or tangible characteristics with respect to the computer.

The extended SQL compiler with the specifically configured functionalities enables the automatic generation of SQL code in runtime, which results in an improved processing result with higher accuracy and lower error rate, as mentioned above.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized method of data management using extended Structured Query Language (SQL), the method performed by a processing and memory circuitry (PMC) and comprising:

executing an extended SQL script created in response to a data query request, the extended SQL script comprising at least one operator of: a first operator embedding a SQL statement, or a second operator embedding a named entity, wherein the at least one operator is not a standard SQL operator and is indicative of priority of evaluation of embedded content thereof upon the extended SQL script being executed, the executing performed by an extended SQL executor comprising an extended SQL compiler and a standard SQL executor, and comprising:

identifying, by the extended SQL compiler, the at least one operator in the extended SQL script;

for each of the at least one operator, evaluating, by the extended SQL compiler, the embedded content thereof in runtime to dynamically generate, by a parser in the extended SQL compiler, SQL code based on a runtime input;

replacing, by the extended SQL compiler, each of the at least one operator and the embedded content thereof in the extended SQL script with the generated SQL code thereof, giving rise to generate a standard SQL script; and wherein the extended SQL script comprises at least one second operator embedding a named entity, wherein a value of the named entity is adaptively configured in runtime upon evaluation, and said evaluating comprises retrieving the value of the named entity in runtime and replacing the at least one second operator and the named entity thereof with the retrieved value, wherein the value of the named entity is configured based on runtime user inputs and runtime system environment configurations;

running, by the standard SQL executor, the standard SQL script to obtain a processing result of the data query request;

wherein the extended SQL compiler is an added compiler program that, when executed on the PMC, transforms the PMC into a specialized machine state capable of converting the extended SQL script into the standard SQL script.

2. The computerized method according to claim 1, wherein the extended SQL script comprises at least one first operator embedding a SQL statement, wherein the SQL statement is a standard SQL statement or an extended SQL statement.

3. The computerized method according to claim 1, wherein the extended SQL script comprises an outer first operator embedding an extended SQL statement comprising one or more inner layers of one or more first operators, and/or one or more second operators nested therein, wherein, upon execution of the extended SQL script, the respective embedded contents of the outer first operator and the one or more inner layers of operators are recursively evaluated from an innermost layer to the outer first operator.

4. The computerized method according to claim 1, wherein the at least one operator is specifically defined with a unique syntax.

5. The computerized method according to claim 4, wherein the first operator is represented by double curly braces, and the second operator is represented by single curly braces.

6. A computerized system of data management using extended Structured Query Language (SQL), the system comprising a processing and memory circuitry (PMC) configured to:

execute an extended SQL script created in response to a data query request, the extended SQL script comprising at least one operator of: a first operator embedding a SQL statement, or a second operator embedding a named entity, wherein the at least one operator is not a standard SQL operator and is indicative of priority of evaluation of embedded content thereof upon the extended SQL script being executed, the executing performed by an extended SQL executor comprising an extended SQL compiler and a standard SQL executor, and comprising:

identifying, by the extended SQL compiler, the at least one operator in the extended SQL script;

for each of the at least one operator, evaluating, by the extended SQL compiler, the embedded content thereof in runtime to dynamically generate, by a parser in the extended SQL compiler, SQL code based on a runtime input;

replacing, by the extended SQL compiler, each of the at least one operator and the embedded content thereof in the extended SQL script with the generated SQL code thereof, giving rise toto generate a standard SQL script; and wherein the extended SQL script comprises at least one second operator embedding a named entity, wherein a value of the named entity is adaptively configured in runtime upon evaluation, and said evaluating comprises retrieving the value of the named entity in runtime and replacing the at least one second operator and the named entity thereof with the retrieved value, wherein the value of the named entity is configured based on runtime user inputs and runtime system environment configurations;

running, by the standard SQL executor, the standard SQL script to obtain a processing result of the data query request;

wherein the extended SQL compiler is an added compiler program that, when executed on the PMC, transforms the PMC into a specialized machine state capable of converting the extended SQL script into the standard SQL script.

7. The computerized system according to claim 6, wherein the extended SQL script comprises at least one first operator embedding a SQL statement, wherein the SQL statement is a standard SQL statement or an extended SQL statement.

8. The computerized system according to claim 6, wherein the extended SQL script comprises an outer first operator embedding an extended SQL statement comprising one or more inner layers of one or more first operators, and/or one or more second operators nested therein, wherein, upon execution of the extended SQL script, the respective embedded contents of the outer first operator and the one or more inner layers of operators are recursively evaluated from an innermost layer to the outer first operator.

9. The computerized system according to claim 6, wherein the at least one operator is specifically defined with a unique syntax.

10. The computerized system according to claim 9, wherein the first operator is represented by double curly braces, and the second operator is represented by single curly braces.

11. A non-transitory computer readable storage medium tangibly embodying a program of instructions that, when executed by a computer, cause the computer to perform a method of data management using extended Structured Query Language (SQL), the method comprising:

executing an extended SQL script created in response to a data query request, the extended SQL script comprising at least one operator of: a first operator embedding a SQL statement, or a second operator embedding a named entity, wherein the at least one operator is not a standard SQL operator and is indicative of priority of evaluation of embedded content thereof upon the extended SQL script being executed, the executing performed by an extended SQL executor comprising an extended SQL compiler and a standard SQL executor, and comprising:

identifying, by the extended SQL compiler, the at least one operator in the extended SQL script;

for each of the at least one operator, evaluating, by the extended SQL compiler, the embedded content thereof in runtime to dynamically generate, by a parser in the extended SQL compiler, SQL code based on a runtime input;

replacing, by the extended SQL compiler, each of the at least one operator and the embedded content thereof in the extended SQL script with the generated SQL code thereof, giving rise toto generate a standard SQL script; and wherein the extended SQL script comprises at least one second operator embedding a named entity, wherein a value of the named entity is adaptively configured in runtime upon evaluation, and said evaluating comprises retrieving the value of the named entity in runtime and replacing the at least one second operator and the named entity thereof with the retrieved value, wherein the value of the named entity is configured based on runtime user inputs and runtime system environment configurations;

running, by the standard SQL executor, the standard SQL script to obtain a processing result of the data query request;

wherein the extended SQL compiler is an added compiler program that, when executed on the PMC, transforms the PMC into a specialized machine state capable of converting the extended SQL script into the standard SQL script.

12. The non-transitory computer readable storage medium according to claim 11, wherein the extended SQL script comprises at least one first operator embedding a SQL statement, wherein the SQL statement is a standard SQL statement or an extended SQL statement.

13. The non-transitory computer readable storage medium according to claim 11, wherein the extended SQL script comprises an outer first operator embedding an extended SQL statement comprising one or more inner layers of one or more first operators, and/or one or more second operators nested therein, wherein, upon execution of the extended SQL script, the respective embedded contents of the outer first operator and the one or more inner layers of operators are recursively evaluated from an innermost layer to the outer first operator.

14. The non-transitory computer readable storage medium according to claim 11, wherein the at least one operator is specifically defined with a unique syntax.

* * * * *